(12) United States Patent
Fujita et al.

(10) Patent No.: US 8,287,629 B2
(45) Date of Patent: Oct. 16, 2012

(54) HYDROGEN GAS STORAGE DEVICE

(75) Inventors: Katsuyoshi Fujita, Kariya (JP);
Hidehito Kubo, Kariya (JP); Daigoro Mori, Mishima (JP); Katsuhiko Hirose, Aichi (JP); Norihiko Haraikawa, Mishima (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 388 days.

(21) Appl. No.: 12/600,091

(22) PCT Filed: Jun. 4, 2008

(86) PCT No.: PCT/JP2008/060287
§ 371 (c)(1),
(2), (4) Date: Nov. 13, 2009

(87) PCT Pub. No.: WO2008/149897
PCT Pub. Date: Dec. 11, 2008

(65) Prior Publication Data
US 2010/0219087 A1    Sep. 2, 2010

(30) Foreign Application Priority Data
Jun. 6, 2007    (JP) .................................. 2007-150987

(51) Int. Cl.
*B01D 53/02* (2006.01)
*F17C 11/00* (2006.01)
(52) U.S. Cl. ............................. 96/126; 206/0.7; 429/515
(58) Field of Classification Search .................... 96/121, 96/126, 146; 206/0.7; 423/648.1, 658.2; 429/507, 508, 512, 515, 516; 420/900
See application file for complete search history.

(56) References Cited

U.S. PATENT DOCUMENTS

| | | | | |
|---|---|---|---|---|
| 4,165,569 A | * | 8/1979 | MacKay | .......................... 34/416 |
| 4,187,092 A | * | 2/1980 | Woolley | ......................... 62/46.2 |
| 4,446,111 A | | 5/1984 | Halene et al. | |
| 4,859,427 A | * | 8/1989 | Konishi et al. | ................ 422/159 |

(Continued)

FOREIGN PATENT DOCUMENTS

JP    58-8899 A    1/1983
(Continued)

OTHER PUBLICATIONS

Mori, D. et al., "High-Pressure Metal Hydride Tank for Fuel Cell Vehicles," *Society of Automotive Engineers of Japan, Inc.*, pp. 560-564, 2007.

(Continued)

*Primary Examiner* — Frank Lawrence, Jr.
(74) *Attorney, Agent, or Firm* — Locke Lord LLP

(57) ABSTRACT

An MH tank module 2 has a hollow outer shell portion 12 formed of metal. The outer shell portion 12 has a plurality of MH powder retaining chambers 22 defined by a plurality of fins 20. A plurality of MH tank modules 2 are bound together by a first tank holder 10 and a second tank holder 11. The tank holders 10, 11 are each configured by fastening and fixing first, second, third, and fourth holder components 28-31, which are separate from one another. The first to fourth holder components 28-31 each have a heat medium passage 28f-31f. The first to fourth holder components 28-31 each have recessed portions 33 each corresponding to the shape of a side portion of each MH tank module 2. The MH tank modules 2 are held individually by the corresponding recessed portions 33.

5 Claims, 3 Drawing Sheets

U.S. PATENT DOCUMENTS

| | | | |
|---|---|---|---|
| 6,432,379 B1 * | 8/2002 | Heung | 423/648.1 |
| 7,455,723 B2 * | 11/2008 | Voss et al. | 96/126 |
| 7,517,396 B2 * | 4/2009 | Arnold et al. | 96/126 |
| 7,651,554 B2 * | 1/2010 | Tan et al. | 96/108 |
| 8,051,977 B2 * | 11/2011 | Fujita et al. | 206/0.7 |
| 2003/0215684 A1 | 11/2003 | Yang et al. | |
| 2005/0000234 A1 | 1/2005 | Kimbara et al. | |

FOREIGN PATENT DOCUMENTS

| | | |
|---|---|---|
| JP | 60-29563 A | 2/1985 |
| JP | 2000-320921 A | 11/2000 |
| JP | 2001-208444 A | 8/2001 |
| JP | 2004-053009 A | 2/2004 |
| JP | 2004-340530 A | 12/2004 |
| JP | 2004-346956 A | 12/2004 |
| JP | 2005-098336 A | 4/2005 |

OTHER PUBLICATIONS

International Search Report issued on Aug. 5, 2008, for international application No. PCT/JP2008/060287.

International Preliminary Report on Patentability for corresponding PCT Application No. PCT/JP2008/060287, issued Dec. 2009.

* cited by examiner

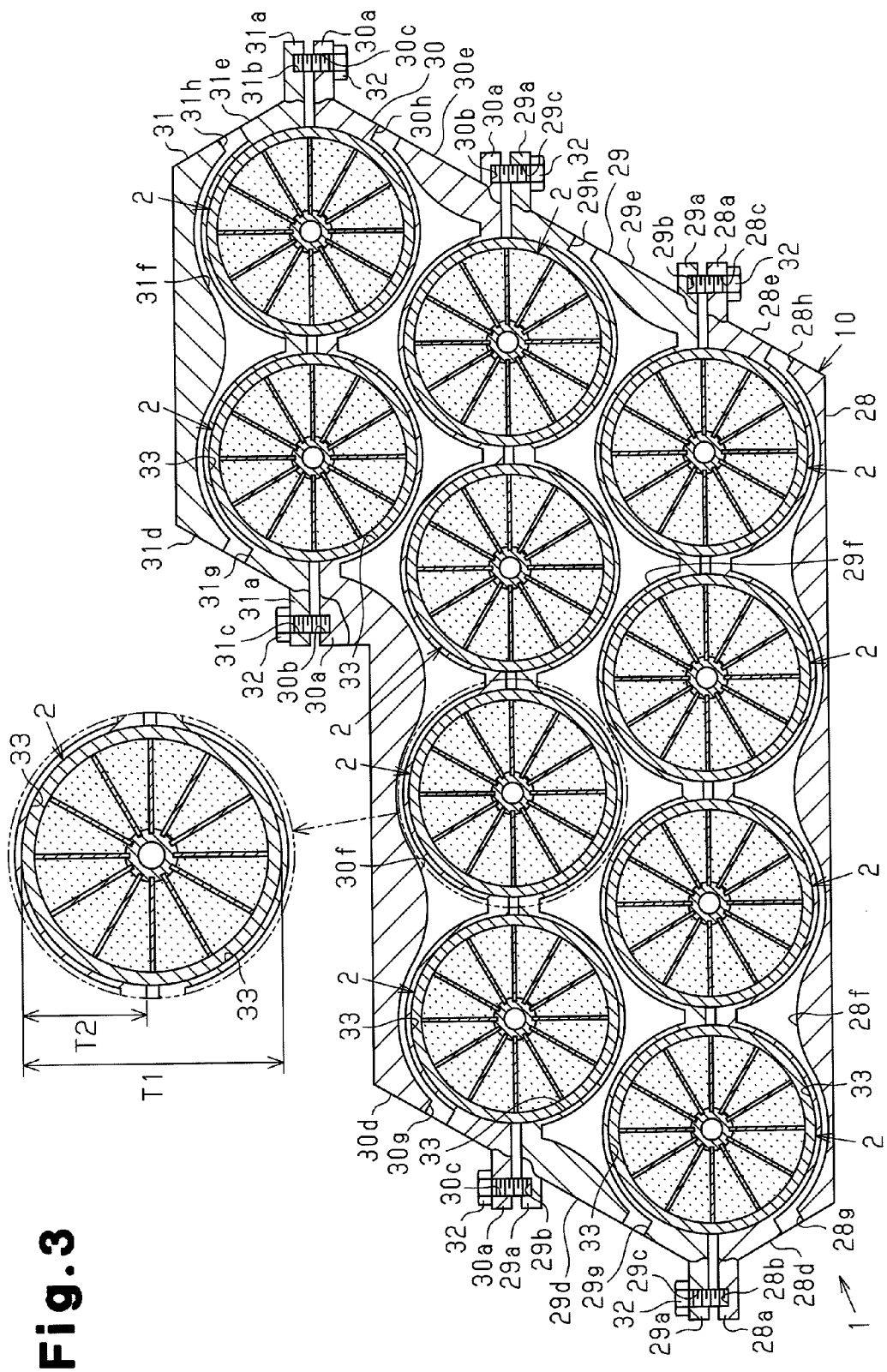

HYDROGEN GAS STORAGE DEVICE

This application claims the benefit of International Application Number PCT/JP2008/060287, filed on Jun. 4, 2008 under 35 USC §371, entitled, "HYDROGEN GAS STORAGE DEVICE" which claims the benefit of Japanese Patent Application Number JP 2007-150987, filed on Jun. 6, 2007, all of which are hereby incorporated by reference.

FIELD OF THE INVENTION

The present invention relates to a hydrogen gas storage device configured by a plurality of tank modules in which hydrogen absorbing metal is retained.

BACKGROUND OF THE INVENTION

Using a hydrogen gas storage tank retaining powdered hydrogen absorbing metal (hereinafter, referred to as "MH") as a hydrogen supply source of an electric vehicle having a fuel cell has been considered. The hydrogen gas storage tank stores the MH, which stores hydrogen, and supplies hydrogen to the hydrogen supply source by releasing the hydrogen from the MH. As one such type of hydrogen gas storage tank, a hydrogen gas storage tank having a heat medium line extending through a retaining chamber, which retains the MH, has been considered. Heat exchange takes place between the MH and the heat medium.

Also, Patent Document 1 proposes a heat utilization system employing hydrogen absorbing metal, which includes a plurality of stick pipes each configuring a sealed cell retaining hydrogen absorbing metal. Heat medium for outputting cold energy flows outside each of the stick pipes and is cooled through the endothermic effect of the hydrogen absorbing metal. In the heat utilization system, a partition wall dividing a heat medium passage, in which the heat medium flows, into a plurality of portions is arranged in a block case configuring the heat medium passage. The aforementioned cells extend through the partition wall and are arranged in the heat medium passage. The hydrogen absorbing metal absorbs heat from the heat medium when the heat medium flows on the outer surfaces of the cells.

Patent Document 2 proposes a technique in which a single hydrogen gas storage device is configured by stacking a plurality of flat containers, in which hydrogen absorbing metal is received, and fastening and fixing the stacked containers together using tie bolts. Patent Document 3 proposes a heat utilization system employing hydrogen absorbing metal, in which a plurality of stick-like cells accommodating hydrogen absorbing metal in a sealed state are axially clamped together between a first fixing board and a second fixing board and fastened and fixed together using bolts.

The heat utilization system described in Patent Document 1 is not intended to be used as, for example, a hydrogen supply source of an electric vehicle having a fuel cell. The stick-like cells are thus small-sized and light-weighted. Accordingly, in the heat utilization system, the cells are supported only by the partition wall, which is arranged in the block case. However, when the heat utilization system described in Patent Document 1 is employed as, for example, a hydrogen supply source of an electric vehicle having a fuel cell, a large amount of MH must be retained in the cells, and the weight of each cell increases. As a result, the cells cannot be stably fixed if the cells are only supported by the partition wall.

The hydrogen gas storage device described in Patent Document 2 clamps and fixes the stacked containers together between reinforcement boards. In this configuration, the fastening force of the tie bolts is dispersed to the multiple containers. Accordingly, in order to reliably bind the containers together, great fastening force must be applied to the tie bolts.

In the heat utilization system described in Patent Document 3, the multiple cells are clamped and fixed together between the first fixing board and the second fixing board in the axial direction. Accordingly, like the case of Patent Document 2, the binding force applied to the cells by the first fixing board and the second fixing board is dispersed to the cells. It is thus necessary to apply great fastening force to the bolts so as to reliably bind the cells together.

Patent Document 1: Japanese Laid-Open Patent Document No. 2001-208444
Patent Document 2: Japanese Laid-Open Patent Document No. 60-29563
Patent Document 3: Japanese Laid-Open Patent Document No. 2000-320921

SUMMARY OF THE INVENTION

Accordingly, it is an objective of the present invention to provide a hydrogen gas storage device capable of applying necessary binding force to a plurality of tank modules, each of which retains MH, without applying great fastening force to fastening members.

To achieve the foregoing objective and in accordance with one aspect of the present invention, a hydrogen gas storage device including a plurality of tank modules, at least one tank holder, and a heat medium passage is provided. Each tank modules has a hollow outer shell and a heat conductive member. The hollow outer shell portion is formed of metal and receiving a hydrogen absorbing metal, and the heat conductive member is capable of conducting heat to both of the outer shell portion and the hydrogen absorbing metal. The tank holder is configured by fastening and fixing a plurality of separate holder components together using a fastening member. The heat medium passage is formed in at least one of the holder components. A heat medium flows in the heat medium passage. The holder components have recessed portions each corresponding to the shape of a side portion of the corresponding tank module. The recessed portions hold the corresponding tank modules individually. Heat exchange occurs between the heat medium flowing in the heat medium passage and the tank modules.

BRIEF DESCRIPTION OF THE DRAWINGS

FIG. 3 is a cross-sectional view taken along line 3-3, showing the hydrogen gas storage device illustrated in FIG. 1;

DETAILED DESCRIPTION OF THE PREFERRED EMBODIMENTS

An embodiment of the present invention will now be described with reference to FIGS. 1 to 4.

Figure 1:
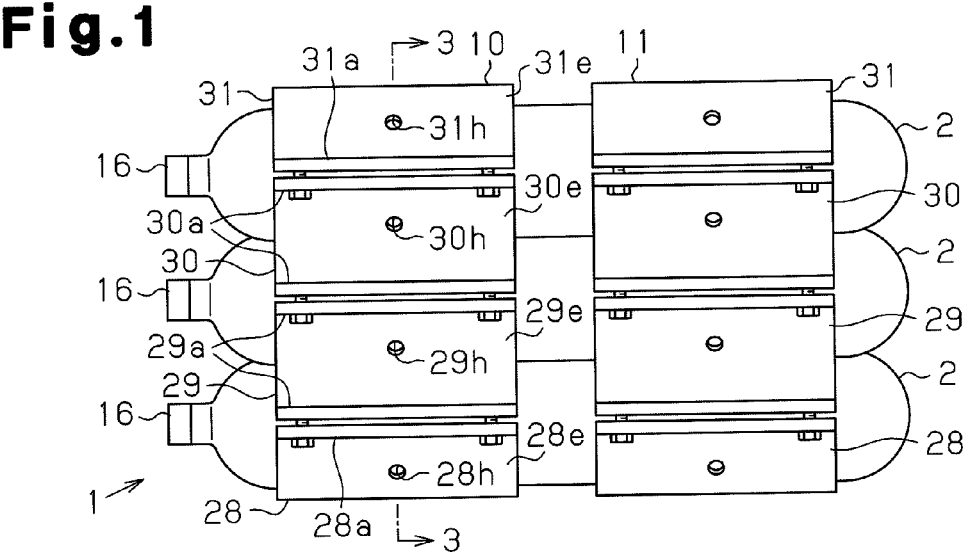
FIG. 1 is a side view schematically showing a hydrogen gas storage device according to one embodiment of the present invention.

As shown in FIGS. 1 and 3, a hydrogen gas storage device 1 includes a plurality of (in the illustrated embodiment, ten) MH tank modules 2, which are stacked together while placed horizontally. The MH tank modules 2 are bound together by a first tank holder 10 and a second tank holder 11.

Figure 2A:
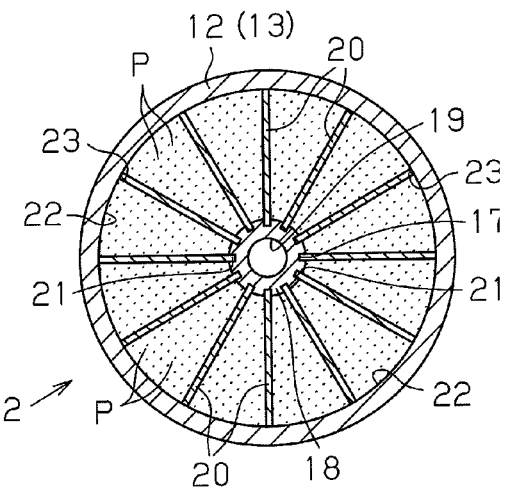
FIG. 2A is a cross-sectional view showing an MH tank module illustrated in FIG. 1.
Figure 2B:
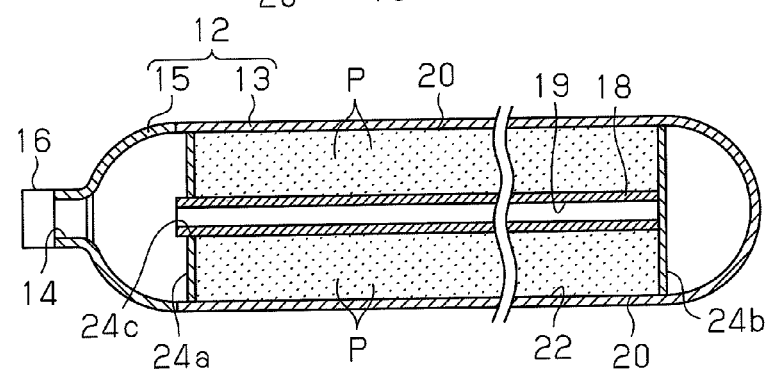
FIG. 2B is a cross-sectional side view showing the MH tank module illustrated in FIG. 1.

As illustrated in FIGS. 2A and 2B, each of the MH tank modules 2 substantially has an elongated columnar shape. Each MH tank module 2 is sized with the number of the MH tank modules 2 taken into consideration in such a manner that the MH tank module 2 is capable of supplying a sufficient amount of hydrogen to a hydrogen supply destination. The MH tank module 2 is formed of metal (for example, aluminum alloy) and has an outer shell portion 12, which has such a strength that the outer shell portion 12 tolerates sufficiently when the MH tank module 2 is filled with hydrogen and the pressure in the MH tank module 2 reaches a predetermined level (which is, for example, 10 MPa). The outer shell portion 12 is hollow and has opposite dome-shaped ends. The outer shell portion 12 has a tubular body portion 13 having a dome-shaped bottom and a dome body 15, which is joined and welded to an opening end of the body portion 13.

The dome body 15 has a hole 14, and a valve 16 is arranged in the hole 14. When the port of the valve 16 is switched, the MH tank module 2 is switched between a hydrogen release state and a hydrogen fill state. A non-illustrated seal ring is arranged between the valve 16 and the hole 14.

As illustrated in FIG. 2A, a hydrogen flow pipe 18, which is formed of porous material and has a plurality of axial grooves 17 defined in the outer circumferential surface of the hydrogen flow pipe 18, is arranged at the center of the outer shell portion 12. A hydrogen passage 19 serving as a passage in which hydrogen flows is provided in the hydrogen flow pipe 18. The hydrogen passage 19 axially extends along the axis of the hydrogen flow pipe 18. Hydrogen thus flows in the MH tank module 2 along the entire longitudinal direction through the hydrogen passage 19. The grooves 17 are spaced apart at equal intervals in the circumferential direction of the hydrogen flow pipe 18 and extend along the entire length of the hydrogen flow pipe 18.

Fin 20 serving as heat conductive members are formed by metal plates (formed of, for example, aluminum alloy) and each attached to the outer circumference of the hydrogen flow pipe 18 by engaging a first end 21 with the corresponding groove 17. A second end 23 of each fin 20 is held in contact with an inner wall portion of the outer shell portion 12. When the fins 20 are attached to the hydrogen flow pipe 18, the fins 20, the hydrogen flow pipe 18, and the outer shell portion 12 form a plurality of retaining chambers 22 retaining MH powder P. Each of the fins 20 is configured in such a manner that the fins 20 conduct heat to the MH powder P and the outer shell portion 12.

As illustrated in FIG. 2B, disk-like end plates 24a, 24b are welded and secured to opposite longitudinal ends of the fins 20. The end plates 24a, 24b close openings of the retaining chambers 22 at opposite longitudinal sides. A non-illustrated inlet hole and a stopper closing the inlet hole are arranged in one of the end plates, which is the end plate 24a, at positions corresponding to the retaining chambers 22. The MH powder P is poured into each of the retaining chambers 22 through the inlet hole. A through hole 24c, through which the hydrogen flow pipe 18 extends, is formed in the end plate 24a.

In the illustrated embodiment, the diameter T1 of each MH tank module 2 is 50 to 100 mm and the entire length of the MH tank module 2 is 800 to 1000 mm. With reference to FIG. 1, the first tank holder 10 binds first end portions of the MH tank modules 2 together and the second tank holder 11 binds second end portions of the MH tank modules 2 together. The first tank holder 10 and the second tank holder 11 are formed by cast products and each have a width greater than the diameter T1 of the MH tank module 2.

The first tank holder 10 binds the MH tank modules 2 in a state stacked in a three layers. Four MH tank modules 2 are arranged in the first layer and the second layer each. In the third layer, two MH tank modules 2 are arranged at one side. The first tank holder 10 is divided into a first holder component 28, a second holder component 29, a third holder component 30, and a fourth holder component 31 in such a manner that the MH tank modules 2, which are stacked together in layers, are held individually by the corresponding holder components 28, 29, 30, 31. The bottom of the first tank holder 10 is configured by the first holder component 28, and a non-illustrated threaded hole is formed in the bottom surface of the first holder component 28.

Each of the first to fourth holder components 28-31 includes a fastened portion 28a-31a, which is arranged at the boundary between the holder component 28-31 and the adjacent one of the holder components 28-31. In FIG. 3, the fastened portions 28a-31a are provided at the left and right sides of the corresponding one of the first to fourth holder components 28-31. In the boundary between each adjacent pair of the holder components, the fastened portions at the left and right sides of one holder component are opposed to the fastened portions at the left and right sides of the other holder component. Two threaded holes are formed in the corresponding one of each opposing pair of the fastened portions. Two insertion holes are formed in the other one of the fastened portions. The threaded holes are represented by reference numerals 28b-31b and the insertion holes are represented by reference numerals 28c-31c.

At the side corresponding to first side surfaces 28d-31d of the first to fourth holder components 28-31, each opposing pair of the fastened portions 28a-31a are joined together by inserting a bolt 32 serving as a fastening member through the corresponding one of the insertion holes 29c-31c from above and threading the bolt 32 to the associated one of the threaded holes 28b-30b. At the side corresponding to second side surfaces 28e-31e of the first to fourth holder components 28-31, each opposing pair of the fastened portions 28a-31a are joined together by inserting a bolt 32 serving as a fastening member through the corresponding one of the insertion holes 28c-30c from below and threading the bolt 32 to the associated one of the threaded holes 29b-31b. By joining each opposing pair of the fastened portions 28a-31a to each other, the first to fourth holder components 28-31, which are separate from one another, are fastened and fixed together as an integral body.

Each of the first to fourth holder components 28-31 has a plurality of recessed portions 33, each of which is configured by a recessed surface extending along the circumferential surface of the MH tank module 2. In other words, each recessed portion 33 is shaped to match the shape of the side portion of the MH tank module 2. In each holder component 28-31, the recessed portions 33 are spaced apart at equal intervals. Those of the recessed portions 33 facing upward in the second holder component 29 are located offset with respect to those of the recessed portions 33 facing downward in the second holder component 29 by the amount corresponding to a half of each interval between the recessed portions 33. The recessed portions 33 facing upward in the second holder component 29 are arranged in such a manner as to cross an imaginary plane that contacts all of the recessed portions 33 facing downward in the second holder component 29. Similarly, those of the recessed portions 33 facing upward in the third holder component 30 are located offset with respect to those of the recessed portions 33 facing downward in the third holder component 30 by the amount corresponding to a half of each interval between the recessed portions 33. The recessed portions 33 facing upward in the third holder component 30 are arranged in such a manner as to cross an imaginary plane that contacts all of the recessed portions 33 facing downward in the third holder component 30.

When each adjacent pair of the holder components 28-31 are fastened and fixed together, the recessed portions 33 of the adjacent ones of the holder components 28-31 are arranged to be opposed to each other. The entire recessed surfaces of each opposing pair of the recessed portions 33 are capable of contacting the circumferential surfaces of the associated MH tank modules 2. In each opposing pair of the recessed portions 33, the sum of the distance T2 from the imaginary plane including the opening of one of the recessed portions 33 to the lowermost portion of the recessed portion 33 and the distance T2 from the imaginary plane including the opening of the other one of the recessed portions 33 to the lowermost portion of the recessed portion 33 is smaller than the diameter T1 of each MH tank module 2. In other words, the sum of the depth T2 of each adjacent pair of the recessed portions 33 is smaller than the diameter T1 of the MH tank module 2. When the adjacent pairs of the holder components 28-31 are fastened and fixed together, each MH tank module 2 is held through the opposing ones of the recessed portions 33.

Figure 4:
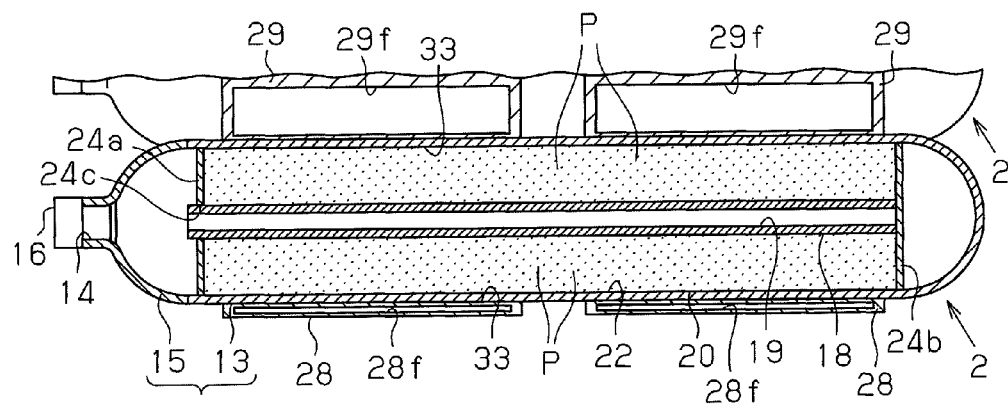
FIG. 4 is a cross-sectional side view schematically showing a portion of the hydrogen gas storage device illustrated in FIG. 1.

Heat medium passages 28$f$-31$f$ are formed in the first to fourth holder components 28-31, respectively. Each one of the heat medium passages 28$f$-31$f$ extends in a direction perpendicular to the axial direction of the corresponding one of the MH tank modules 2 and along the recessed surface of the associated one of the recessed portions 33. The heat medium passages 28$f$-31$f$ are configured in such a manner as to prevent exposure of the MH tank modules 2 to heat medium (water, oil, engine coolant, or the like) when the heat medium flows. Each heat medium passage 28$f$-31$f$ is a hole extending through the corresponding holder component 28-31 from the first side surface 28$d$-31$d$ to the second side surface 28$e$-31$e$, which is located at the opposite side to the first side surface 28$d$-31$d$. The heat medium passage 28$f$-31$f$ has an inlet port 28$g$-31$g$ having an opening in the first side surface 28$d$-31$d$ and an outlet port 28$h$-31$h$ having an opening in the second side surface 28$e$-31$e$. The heat medium passage 29$f$ formed in the second holder component 29 is located between the first layer of the MH tank modules 2 and the second layer of the MH tank modules 2. A portion of the heat medium passage 30$f$ formed in the third holder component 30 is located between the second layer of the MH tank modules 2 and the third layer of the MH tank modules 2. The shape and/or the size of each heat medium passage 28$f$-31$f$ are designed in such a manner that the first to fourth holder components 28-31 have such a strength that the holder components 28-31 are prevented from being damaged even when holding the MH tank modules 2. Specifically, as illustrated in FIG. 4, each heat medium passage 28$f$-31$f$ has a flat cross section in a direction perpendicular to the extending direction of the heat medium passage 28$f$-31$f$. The heat medium flowing in each heat medium passage 28$f$-31$f$ exchanges heat with the corresponding MH tank modules 2 held by the recessed portions 33 through the associated holder components 28-31.

The inlet ports 28$g$-31$g$ and the outlet ports 28$h$-31$h$ each communicate with pipe connected to a non-illustrated heat medium tank. The heat medium flows from the heat medium tank to the heat medium passages 28$f$-31$f$ through the corresponding inlet ports 28$g$-31$g$, and returns to the heat medium tank through the outlet ports 28$h$-31$h$. The second tank holder 11 is configured in the same manner as the first tank holder 10.

A method of manufacturing the hydrogen gas storage device 1 will hereafter be explained.

To manufacture each MH tank module 2, the body portion 13 is first prepared and the fins 20 are attached to the hydrogen flow pipe 18. The end plates 24$a$, 24$b$ are then welded and joined to the opposite longitudinal ends of the fins 20. Next, an assembled body including the hydrogen flow pipe 18, the fins 20, and the end plates 24$a$, 24$b$ is arranged in the body portion 13. Subsequently, after pouring the MH powder P into the retaining chambers 22 through the non-illustrated inlet hole, the inlet hole is closed using the stopper to seal the retaining chambers 22. Afterwards, the dome body 15 having the valve 16 is welded and joined to the opening end of the body portion 13. In this manner, the MH tank module 2 is formed. After a necessary number of MH tank modules 2 are manufactured in the above-described manner, the hydrogen gas storage device 1 is assembled together.

In assembly of the hydrogen gas storage device 1, the first holder component 28 of each tank holder 10, 11 is placed. A plurality of MH tank modules 2 are prepared and four of the MH tank modules 2 are mounted on the four recessed portions 33 of the first holder component 28. The second holder component 29 is placed on the first holder component 28 in such a manner that the recessed portions 33 in the lower side of the second holder component 29 are engaged with the MH tank modules 2 on the first holder component 28. The first holder component 28 and the second holder component 29 are then fastened and fixed together using the bolts 32.

Subsequently, four MH tank modules 2 are mounted on the recessed portions 33 in the upper side of the second holder component 29. The third holder component 30 is mounted on the second holder component 29 in such a manner that the recessed portions 33 in the lower side of the third holder component 30 are engaged with the MH tank modules 2 on the second holder component 29. The second holder component 29 and the third holder component 30 are then fastened and fixed together using the bolts 32. Further, two MH tank modules 2 are arranged in the recessed portions 33 in the upper side of the third holder component 30. The fourth holder component 31 is then mounted on the third holder component 30 in such a manner that the recessed portions 33 of the fourth holder component 31 are engaged with the MH tank modules 2 on the third holder component 30. Subsequently, by fastening and fixing the third holder component 30 and the fourth holder component 31 to each other using the bolts 32, the hydrogen gas storage device 1 is completed.

Operation of the hydrogen gas storage device 1, which is configured as described above, will be described below.

When the hydrogen gas storage device 1 is employed as a hydrogen supply source of an electric vehicle having a fuel cell (hereinafter, referred to as an electric vehicle), which employs hydrogen directly as fuel, the hydrogen gas storage device 1 is mounted in the electric vehicle. Specifically, bolts are passed through non-illustrated bracket holes formed in the electric vehicle and threaded to non-illustrated threaded holes formed in the first holder component 28. This fixes the hydrogen gas storage device 1 to the electric vehicle. Then, by connecting non-illustrated pipes to the inlet ports 28$g$-31$g$ and the outlet ports 28$h$-31$h$ of the heat medium passages 28$f$-31$f$, the heat medium passages 28$f$-31$f$ are connected to the non-illustrated heat medium tank via the pipes. The hydrogen gas storage device 1 is thus completely installed.

The first to fourth holder components 28-31 clamp the corresponding MH tank modules 2 individually by means of the recessed portions 33. Accordingly, fastening force applied to each bolt 32 acts as binding force applied to the respective ones of the MH tank modules 2. The fastening force applied to the bolts 32 thus acts effectively as the binding force applied to the MH tank modules 2, reliably binding the MH tank modules 2 together. As a result, even when the electric vehicle having the hydrogen gas storage device 1 vibrates while traveling and such vibration is transmitted to the hydrogen gas storage device 1, the binding state of the MH tank modules 2 is reliably maintained.

When the hydrogen gas storage device 1 supplies hydrogen to a fuel electrode serving as a hydrogen supply destination, the valve 16 is switched to a hydrogen release state. This permits release of hydrogen from the MH tank modules 2 and the hydrogen is supplied to the fuel electrode through a non-illustrated pipe. In this state, the equilibrium between the hydrogen storage reaction and the hydrogen release reaction of the MH powder P shifts toward the release side, and the hydrogen is released from the MH powder P. Such release of hydrogen is an endothermic reaction. Accordingly, if heat necessary for the release of hydrogen is not supplied by the heat medium, the MH powder P releases the hydrogen by consuming sensible heat and the temperature of the MH powder P decreases. However, heat exchange between the upper and lower sides of each MH tank module 2 is caused by supplying heat medium of a predetermined temperature into the heat medium passages 28f-31f formed in the corresponding first to fourth holder components 28-31 and allowing the heat medium to flow in the heat medium passages 28f-31f. This heats the MH powder P to a predetermined temperature through the first to fourth holder components 28-31, the outer shell portion 12, and the fins 20. The hydrogen release reaction thus progresses smoothly. A portion of the heat medium passage 29f formed in the second holder component 29 and a portion of the heat medium passage 30f formed in the third holder component 30 are located between the corresponding MH tank modules 2. This causes the heat medium flowing in the heat medium passage 29f and the heat medium passage 30f to heat the MH tank modules 2 between which the heat medium passage 29f or the heat medium passage 30f is arranged.

The MH powder P received in the retaining chambers 22 releases hydrogen along the entire longitudinal direction of the MH tank module 2. The released hydrogen is sent to the hydrogen passage 19 through fine holes of the hydrogen flow pipe 18, released from the valve 16 to the exterior of the hydrogen gas storage device 1, and supplied to the fuel electrode. The temperature of the MH powder P is maintained at such a value that the hydrogen release reaction progresses smoothly by adjusting the temperature or the flow rate of the heat medium. As a result, the release of the hydrogen is carried out efficiently in such a manner as to release the amount of hydrogen corresponding to the amount of the hydrogen necessary for the fuel cell.

To refill the hydrogen gas storage device 1 with hydrogen, or, specifically, to allow the MH powder P to store hydrogen, after the hydrogen gas storage device 1 has released hydrogen, the valve 16 is switched to the hydrogen fill state and the hydrogen is introduced from the valve 16 to the hydrogen passage 19 of the hydrogen flow pipe 18. After entering the hydrogen passage 19, the hydrogen flows along the entire longitudinal direction of the MH tank module 2 while being dispersed. In this state, the hydrogen passes through the fine holes of the hydrogen flow pipe 18 and reacts with the MH powder P in the retaining chambers 22 to form a hydride. In this manner, the hydrogen is stored by the MH powder P. The hydrogen is continuously supplied to the MH powder P until the pressure in each MH tank module 2 reaches a predetermined level (for example, 10 MPa). Even after the MH powder P becomes fine powder due to repeated storage and release of the hydrogen, the hydrogen flow pipe 18 functions as a filter with respect to the MH powder P. This prevents the fine MH powder P from leaking to the exterior of the MH tank module 2.

Being an exothermic reaction, the hydrogen storage cannot be carried out smoothly if the heat generated by such reaction is not removed. However, when the hydrogen is supplied, heat exchange is caused between the upper and lower sides of each MH tank module 2 by supplying heat medium at a low temperature to the heat medium passages 28f-31f and allowing the heat medium to flow in the heat medium passages 28f-31f. Accordingly, the heat generated by the MH powder P is absorbed by the heat medium through the first to fourth holder components 28-31, the outer shell portion 12, and the fins 20, and sent to the exterior of the hydrogen gas storage device 1. This maintains the temperature of the MH powder P at such a level that the hydrogen storage progresses smoothly, and the hydrogen storage is efficiently carried out. A portion of the heat medium passage 29f in the second holder component 29 and a portion of the heat medium passage 30f in the third holder component 30 are located between the corresponding MH tank modules 2. This causes the heat medium flowing in the heat medium passage 29f and the heat medium passage 30f to absorb heat from the MH tank modules 2 between which the heat medium passage 29f or the heat medium passage 30f is located.

The illustrated embodiment has the following advantages.

(1) The hydrogen gas storage device 1 has the tank holders each configured by fastening and fixing the first to fourth holder components 28-31 together. Each tank holder binds the multiple MH tank modules 2 together. Accordingly, the hydrogen gas storage device 1 is installed by binding the MH tank modules 2 in a compactly arranged state and fixing the tank holder to the bracket formed in the electric vehicle in this state. This simplifies installation of the hydrogen gas storage device 1 in the electric vehicle compared to a case in which the MH tank modules 2 are fixed one by one.

(2) The MH tank modules 2 are held individually by the recessed portions 33 formed in the first tank holder 10 and the recessed portions 33 formed in the second tank holder 11. The binding force is thus applied to the respective ones of the MH tank modules 2. Accordingly, necessary binding force is applied to each of the MH tank modules 2 without applying great fastening force to the bolts 32.

(3) The heat medium passages 28f-31f are separate from the MH tank modules 2. Accordingly, when the tank holders have equal widths, the recessed portions 33 are held in contact with the corresponding MH tank modules 2 each by a large area compared to a case in which the MH tank modules are exposed to the heat medium passages. This increases the binding force of the first tank holder 10 and the second tank holder 11 with respect to the MH tank modules 2.

(4) A portion of the heat medium passage 29f formed in the second holder component 29 and a portion of the heat medium passage 30f arranged in the third holder component 30 are located between the corresponding MH tank modules 2. Accordingly, in the heat medium passage 29f and the heat medium passage 30f, which are arranged between the MH tank modules 2, the heat medium flowing in each heat medium passage 29f, 30f exchanges heat with at least two of the MH tank modules 2 between which the heat medium passage 29f or the heat medium passage 30f is arranged. This decreases the number of the necessary heat medium passages, compared to a case in which heat medium passages are arranged for the respective MH tank modules 2.

(5) The MH tank modules 2 are fixed together by binding the first end portions of the MH tank modules 2 with the first tank holder 10 and binding the second end portions of the MH tank modules 2 with the second tank holder 11. Accordingly, compared to, for example, a case in which only the central portions of the MH tank modules 2 are bound together, the MH tank modules 2 are reliably bound together in a well-balanced manner. Further, compared to a case employing a tank holder configured by a single body having a width covering the entire length of each MH tank module 2, each of the tank holders is light-weighted.

(6) The hydrogen gas storage device 1 is used as the hydrogen supply source of the electric vehicle having the fuel cell. Since the hydrogen gas storage device 1 binds the MH tank modules 2 together in a compactly arranged state, the hydrogen gas storage device 1 is easily installed even when installation space is restricted as in the case of an automobile.

(7) Each MH tank module 2 is supported by means of the entire recessed surfaces of the corresponding recessed portions 33. Accordingly, compared to a case in which the MH tank modules are inserted through a plate having holes and supported by the plate, resistance to vibration of the MH tank modules 2 is improved.

(8) The heat medium passage 29f extends along the recessed surfaces of the recessed portions 33 facing upward and the recessed portions 33 facing downward formed in the second holder component 29. The heat medium passage 29f is thus located maximally close to those of the MH tank modules 2 between which the heat medium passage 29f is arranged. This improves the efficiency of the heat exchange between the heat medium flowing in the heat medium passage 29f and the MH tank modules 2.

(9) In each opposing pair of the recessed portions 33, the sum of the distance T2 from the imaginary plane including the opening of one of the recessed portions 33 to the lowermost portion of the recessed portion 33 and the distance T2 from the imaginary plane including the opening of the other recessed portion 33 to the lowermost portion of the recessed portion 33 is smaller than the diameter T1 of each MH tank module 2. Accordingly, even if the dimension accuracy of the recessed portions 33 is small, the entire recessed surfaces of each pair of the recessed portions 33 contact the circumferential surface of the corresponding MH tank module 2 when the first to fourth holder components 28-31 are fastened and fixed together.

The present invention is not restricted to the illustrated embodiment but may be embodied in the following forms.

The heat medium passages 28f-31f may be arranged in such a manner that the MH tank modules 2 are exposed to the heat medium passages 28f-31f. For example, the heat medium passage 28f-31f to which the MH tank modules 2 are exposed may be configured by forming a groove in each recessed portion 33 and allowing communication among the grooves in such a manner that each of the grooves forms a heat medium passage. In this case, the outer shell portions 12 of the MH tank modules 2 are exposed directly to the heat medium. This improves the efficiency of the heat exchange between the heat medium and the MH powder P, compared to a case in which the heat exchange between the heat medium and the MH powder P occurs through the first to fourth holder components 28-31. Further, when the MH tank modules 2 are exposed to the heat medium passages 28f-31f, the heat medium flowing in the heat medium passage 28f exchanges heat directly with the MH tank modules 2 without the first holder component 28 in between. Also, the heat medium flowing in the heat medium passage 31f exchanges heat directly to the MH tank modules 2 without the fourth holder component 31 in between. Accordingly, if the heat medium passages 28f-31f are arranged in such a manner that the MH tank modules 2 are exposed to the heat medium passages 28f-31f, the first holder component 28 and the fourth holder component 31 may be formed of fiber-reinforced plastic or resin.

As heat medium passages in which heat medium flows, heat medium passages sending the heat medium from the first side surfaces 28d-31d to the second side surfaces 28e-31e of the first to fourth holder components 28-31 and heat medium passages introducing the heat medium from the second side surfaces 28e-31e to the first side surfaces 28d-31d of the first to fourth holder components 28-31 may be provided. In this case, at the first holder component 28 and the third holder component 30, for example, inlet ports may be formed in the second side surfaces 28e, 30e and outlet ports may be arranged in the first side surfaces 28d, 30d. Further, at the second holder component 29 and the fourth holder component 31, inlet ports are formed in the first side surfaces 29d, 31d and outlet ports are arranged in the second side surfaces 29e, 31e. The heat medium passage 28f and the heat medium passage 30f formed in the first holder component 28 and the third holder component 30, respectively, are configured in such a manner that heat medium flows from the second side surface 28e, 30e to the first side surface 28d, 30d. The heat medium passage 29f and the heat medium passage 31f formed in the second holder component 29 and the fourth holder component 31, respectively, are configured in such a manner that the heat medium flows from the first side surface 29d, 31d to the second side surface 29e, 31e. This configuration ensures a well-balanced heat exchange between the heat medium and those of the MH tank modules 2 located closer to the first side surfaces 28d-31d and those of the MH tank modules 2 located closer to the second side surfaces 28e-31e.

The shape of each heat medium passage 28f-31f may be modified as long as the strength of the corresponding first to fourth holder component 28-31 is ensured to such an extent that the holder component 28-31 is prevented from being damaged when the holder component 28-31 clamps the MH tank modules 2 together. For example, each heat medium passage 28f-31f may have an oval cross section in a direction perpendicular to the extending direction of the heat medium passage 28f-31f. Alternatively, ribs may be arranged in each heat medium passage 28f-31f formed in a flat shape to improve the strength of the corresponding first to fourth holder component 28-31.

Figure 5:
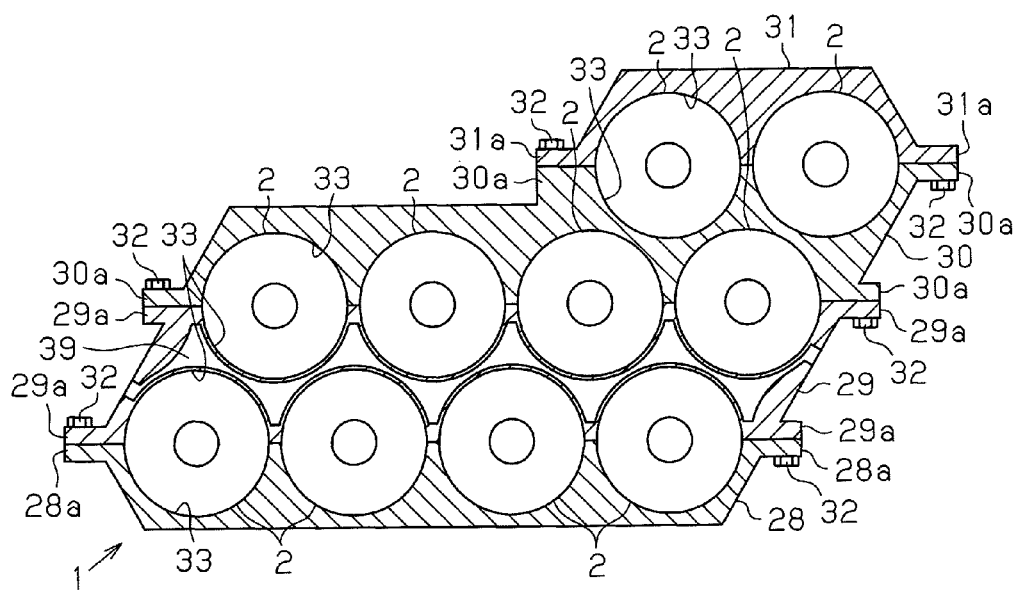
FIG. 5 is a cross-sectional view schematically showing a hydrogen gas storage device according to another embodiment of the present invention.

The number of the heat medium passages 28f-31f formed in the first tank holder 10 and the second tank holder 11 may be altered. The heat medium passage 28f may be omitted from the first holder component 28 so that only the heat medium passages 29f-31f are formed. Alternatively, the heat medium passage 31f may be omitted from the fourth holder component 31 so that only the heat medium passages 28f-30f are provided. In these cases, in order to perform heat exchange through the holder components, the first to fourth holder components 28-31 must be fastened and fixed together in a state in which each adjacent pair of the holder components 28-31 are held in contact with each other. Further, when only one heat medium passage is formed, a heat medium passage 39 is arranged only in the second holder component 29 in such a manner that the heat medium passage is located between the corresponding MH tank modules 2, for example, as illustrated in FIG. 5. The first to fourth holder components 28-31 are fastened and fixed together in a state in which each adjacent pair of the holder components are held in contact with each other. The two of the MH tank modules 2 arranged in the third layer are configured in such a manner that heat exchange occurs between the MH tank modules 2 and the heat medium through the third holder component 30. This configuration allows the heat exchange between the heat medium flowing in the heat medium passage and the multiple MH tank modules 2 as a whole, compared to a case in which a heat medium passage is arranged only in the first holder component 28 and thus located only at one side of each tank holder. In FIG. 5, the first to fourth holder components 28-31 are shown in cross-sectional views and the MH tank modules 2 are shown in front views.

The first tank holder 10 and the second tank holder 11 may be formed as an integral body to provide a tank holder formed by a single body. In this case, the width of the tank holder may be set to such a value that the multiple MH tank modules 2 are sufficiently bound together.

Instead of dividing each tank holder in the direction of the layers of the stacked MH tank modules 2, the tank holder may be divided into a plurality of tank holder components in the direction of the rows of the MH tank modules 2.

Instead of binding the MH tank modules 2 together in a horizontally arranged state using the tank holders, the tank holders may bind the MH tank modules together in an upright state.

As long as the material forming the outer shell portion 12 is metal having necessary heat conductivity, the material does not have to be aluminum alloy. The outer shell portion 12 may be formed of, for example, copper or iron.

The shape of each retaining chamber 22 is not particularly restricted. The retaining chambers 22 may be defined by mounting a plurality of fins in a grid-like manner.

As long as the material forming each fin 20 is metal having necessary heat conductivity, the material may be, for example, copper or iron.

The end plate 24b, which is formed at the side corresponding to the bottom of the body portion 13 in each MH tank module 2, may be omitted. In this case, the hydrogen flow pipe 18 is extended in such a manner that the end surface of the hydrogen flow pipe 18 contacts the bottom of the body portion 13 and the hydrogen flow pipe 18 is filled with the MH powder P to the bottom of the body portion 13. This configuration increases the amount of the hydrogen that may be received in each MH tank module 2.

The hydrogen gas storage device 1 is not restricted to use in the electric vehicle with the fuel cell but may be employed in a hydrogen supply source of a hydrogen engine or a heat pump.

In the method of manufacturing each MH tank module, the outer shell portion may be formed by a method other than welding. For example, by subjecting a metal pipe to plastic machining such as spinning, an outer shell portion having opposite dome-shaped ends may be formed.

The invention claimed is:

1. A hydrogen gas storage device comprising:
   a plurality of tank modules each having a hollow outer shell and a heat conductive member, the hollow outer shell portion being formed of metal and receiving a hydrogen absorbing metal, and the heat conductive member being capable of conducting heat to both of the outer shell portion and the hydrogen absorbing metal;
   at least one tank holder configured by fastening and fixing a plurality of separate holder components together using a fastening member; and
   a heat medium passage formed in at least one of the holder components, a heat medium flowing in the heat medium passage,
   wherein the holder components have recessed portions each corresponding to the shape of a side portion of the corresponding tank module, the recessed portions holding the corresponding tank modules individually, heat exchange occurring between the heat medium flowing in the heat medium passage and the tank modules, and
   wherein the heat medium passage is formed in such a manner that the tank modules are exposed to the heat medium flowing in the heat medium passage.

2. The hydrogen gas storage device according to claim 1, wherein the heat medium passage is arranged between the corresponding ones of the tank modules.

3. The hydrogen gas storage device according to claim 1, wherein the tank holder is one of a plurality of tank holders, the tank holders including at least a first tank holder, which binds first end portions of the tank modules together, and a second tank holder, which binds second end portions of the tank modules together.

4. The hydrogen gas storage device according to claim 1, wherein, when each adjacent pair of the holder components are fastened and fixed together, the recesses of each adjacent pair of the holder components face each other, each facing pair of the recesses holding a corresponding one of the tank modules.

5. The hydrogen gas storage device according to claim 1 employed in an electric vehicle having a fuel cell.

* * * * *